United States Patent [19]

Tarassoff

[11] Patent Number: 4,617,829
[45] Date of Patent: Oct. 21, 1986

[54] DEVICE FOR MEASURING CLAMPING OF GRIPS NOTABLY OF A DETACHABLE GONDOLA LIFT OR CHAIR LIFT

[75] Inventor: Serge Tarassoff, Seyssinet, France

[73] Assignee: Pomagalski S.A., Fontaine, France

[21] Appl. No.: 782,303

[22] Filed: Oct. 1, 1985

[30] Foreign Application Priority Data

Oct. 15, 1984 [FR] France ............................ 84 15868

[51] Int. Cl.⁴ .............................................. G01P 1/00
[52] U.S. Cl. ................................................... 73/865.8
[58] Field of Search ........... 73/432 R, 862.54, 862.64; 177/165; 336/130; 104/209

[56] References Cited

U.S. PATENT DOCUMENTS

| 3,004,152 | 10/1961 | Dyche, Jr. | 73/862.64 |
| 3,569,820 | 3/1971 | Nishimuta | 336/130 |
| 3,585,941 | 6/1971 | Primo | 73/862.54 |
| 3,594,671 | 7/1971 | Frenkel | 336/130 |
| 3,638,497 | 2/1972 | Frenkel | 73/728 |
| 4,008,457 | 2/1977 | Radcliffe | 382/58 |
| 4,294,320 | 10/1981 | Bilstad et al. | 177/1 |
| 4,441,430 | 4/1984 | Brochard | 104/209 |

FOREIGN PATENT DOCUMENTS 2454093 12/1980 France ........................ 73/862.54

Primary Examiner—Stewart J. Levy
Assistant Examiner—Robert R. Raevis
Attorney, Agent, or Firm—Parkhurst & Oliff

[57] ABSTRACT

Monitoring of the clamping of the grips 10 of a detachable gondola lift or chair lift is carried out when the grip passes on a ramp 18 constituted by a T-shaped section. Over a measurement section 1, the base 24 of the T is separated from the upright 26 by a notch 28 to give the base 24 a certain flexibility. The deformation of the base 24, due to the action of the grip operating lever, is measured by a proximity detector 34, which delivers a signal analyzed by an electronic circuit compensating for any drift which may occur. As a result, the invention can be applied to measure the clamping of moving vehicles in general.

9 Claims, 5 Drawing Figures

4,617,829

DEVICE FOR MEASURING CLAMPING OF GRIPS NOTABLY OF A DETACHABLE GONDOLA LIFT OR CHAIR LIFT

BACKGROUND OF THE INVENTION

The invention relates to an aerial ropeway transport installation, notably a detachable chair lift or gondola lift, having grips coupling the loads to the rope which are able to be detached from the rope in the stations.

The adherence of a grip on the rope depends on the clamping pressure of the grip, and the closing spring force is measured by movement of the grip operating lever. State-of-the-art systems with a jack and end-of-travel detector are difficult to adjust and of limited reliability.

SUMMARY OF THE INVENTION

The object of the present invention is to provide a grip clamping measurement system which has increased performance and is easier to use.

In the installation according to the invention, a part of the grip control ramp presents a certain flexibility and a proximity detector cooperates with said flexible part to measure the amplitude of the elastic deformation when a grip passes due to the action of the bearing force of said operating lever on the ramp.

The metallic structure, in this case the ramp, is subjected to the stress of the grip operating lever in the course of closing or opening and this stress is directly proportional or equal to the force of the spring. The elastic deformation of this structure and more particularly of the flexible part of the ramp, is measured by a proximity detector which supplies an analog voltage signal proportional to the ramp/sensor distance and to the force of the spring. Monitoring is carried out automatically when the grip passes on the ramp, for example, in the course of closing of the grip, after the latter has been detached from the rope. The usual operating ramp is thus used to carry this monitoring out, this ramp could moreover be that of the grip attachment or detachment area or a special ramp, located on the trajectory along which the grip moves in the station. It is clear that before and after the grip passes, the deformation is nil, the signal emitted having the value zero. This signal increases as the grip advances to reach a maximum value when the grip reaches the middle of the flexible part where the proximity detector is located.

Appropriate electronic processing of the signal from the detector enables a reliable display and alarm to be achieved, when the clamping force is lower than a predetermined threshold. The ramp comprising a flexible part is made up of a T-shaped section, the base of which forms the bearing face of the operating lever, particularly of the sheave borne by the free end of this lever. The connection between the upright and the base is interrupted over a sufficient length to make this part of the base flexible. This interruption is the result of a notch which separates the flexible part of the base from the edge of the upright and whose width is greater than the maximum deformation. The edgeways-mounted upright constitutes a rigid support fixed to the framework of the installation.

The voltage signal, emitted by the inductive proximity detector, is amplified and shaped to be applied to a multiplexer connected to a converter to transform the voltage signal into a frequency signal proportional to the force of the spring. The converter output is connected to one or more timers which receive a time signal from a clock. The timer is requested for information cyclically by a microprocessor, which determines the maximum value and compares this value with a displayed threshold to trigger an alarm if the value is too low or, if not, to validate the grip and proceed with a display.

BRIEF DESCRIPTION OF THE DRAWINGS

Other advantages and characteristics of the invention will become more clearly apparent from the description which follows of an embodiment of the invention, given as an example only and represented in the accompanying drawings, in which.

DESCRIPTION OF THE PREFERRED EMBODIMENTS

Figure 1:
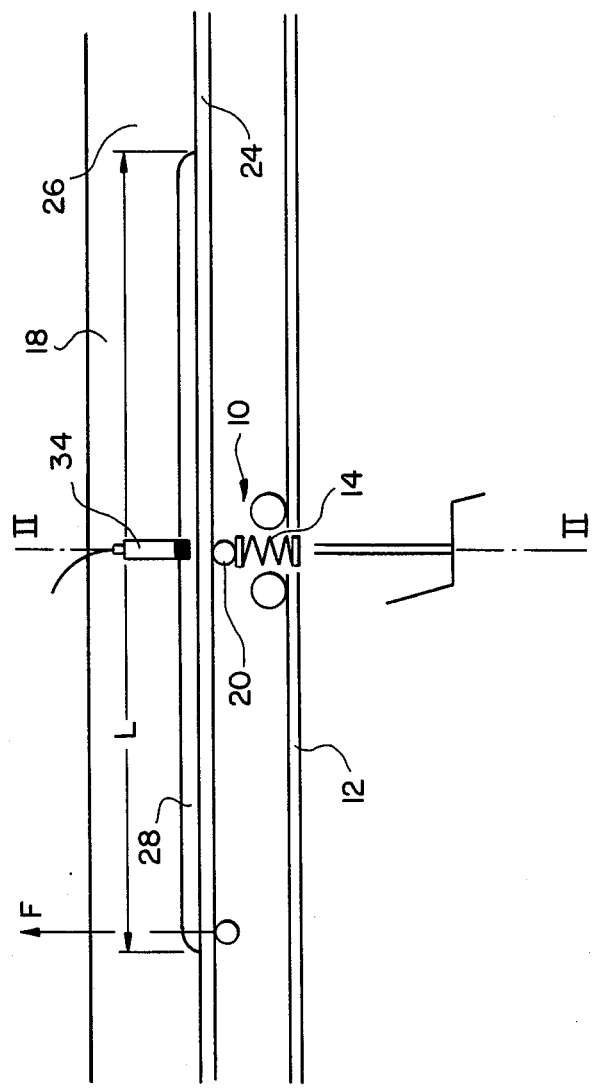
FIG. 1 is a schematic elevational view of a monitoring device according to the invention.
Figure 2:
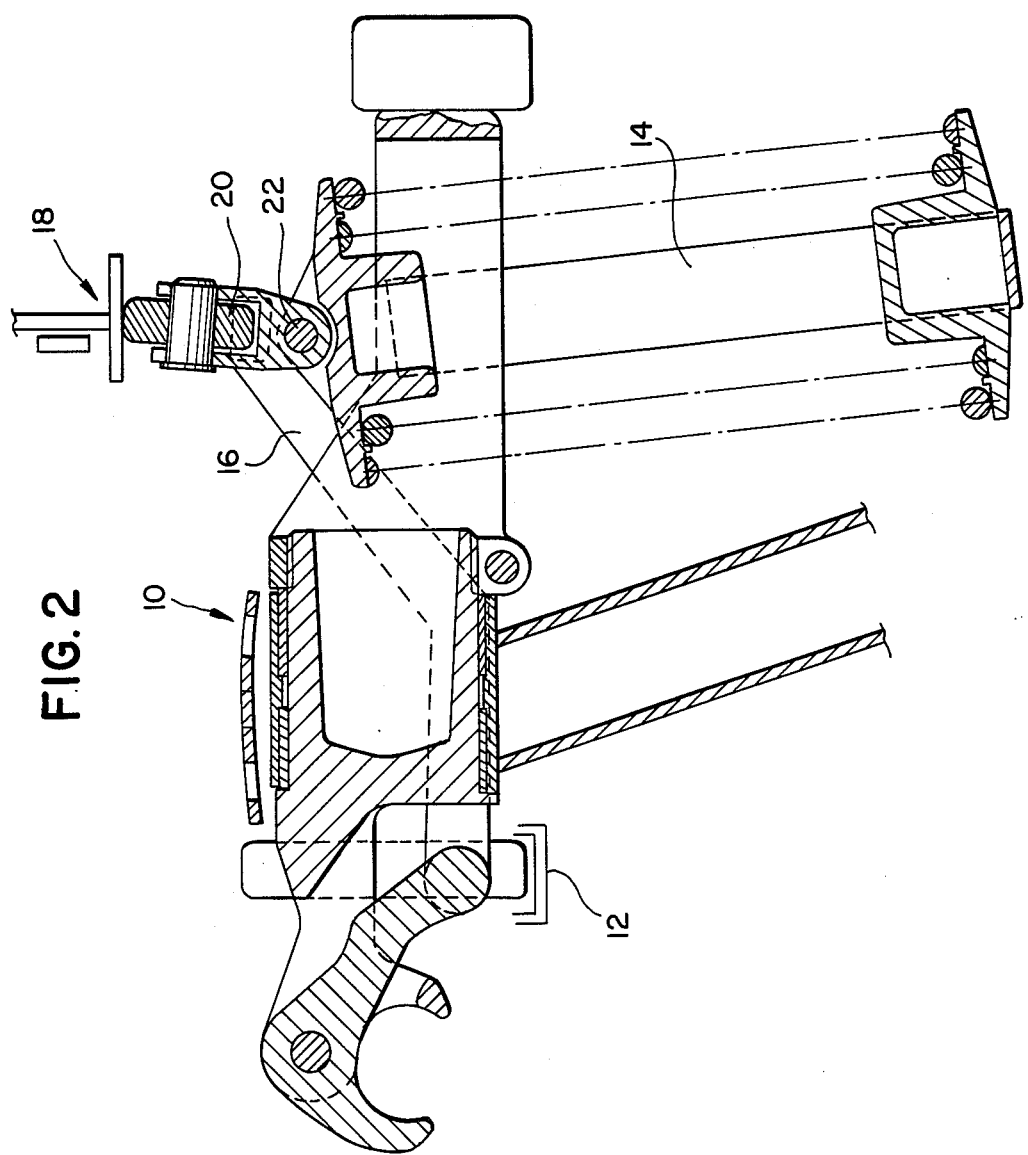
FIG. 2 is a cross-sectional view along the line II—II of FIG. 1.

In the figures, a grip 10 of a detachable chair lift, gondola lift or suchlike, runs detached from the rope in the station on a rail 12. The grip 10 has a spring 14 urging the grip into the closing position and a operating lever 16 bearing a sheave 20, which cooperates with the ramp 18 extending along the rail 12 on the sections where opening and closing of the grip 10 are controlled. The spring 14 is articulated on a spindle 22, brought by the end of the lever 16 into a straight line with the sheave 20 and it can easily be seen that the force exerted by the ramp 18 on the sheave 20 counter-balances the force of the spring 14 or depending on the type of grip is proportional to the force of the spring.

The spring 14 supplies the clamping force of the grip on the rope and this force is proportional to that of the spring 14. An installation of this kind is well-known and described for example in U.S. Pat. No. 4,441,430.

Figure 3:
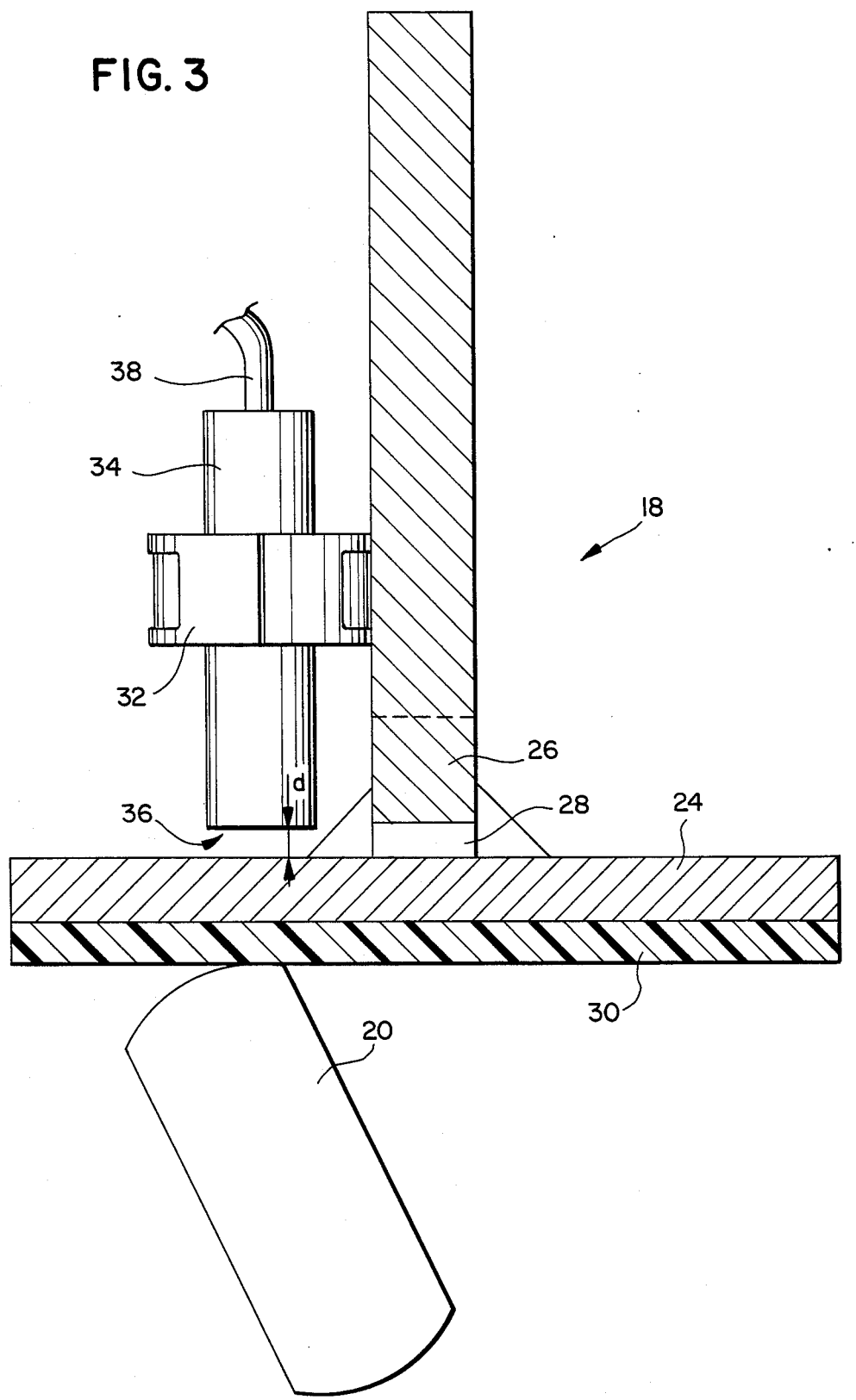
FIG. 3 is an enlarged scale cross-sectional view of the proximity detector.

Referring to FIGS. 1 and 3, it can be seen that the ramp 18, comprised of a reverse T-shaped section, has an appreciably horizontal base 24 and a vertical upright 26. The junction interface between the upright 26 and the base 24 has, over a section L of the ramp 18, a notch 28 at the base of the upright 26, separating the base 24 from the upright 26. The notch 28 can be made on the base 24, the thickness of which is in this case reduced, or can be located between the upright 26 and the base 24. Over the length of the section L, the base 24 is secured at its ends and its small thickness gives it a certain elasticity.

The T-shaped section is metallic, the base 24 having an antifriction coating 30 on the face cooperating with the sheave 20. The upright 26, which works edgeways, constitutes a rigid part supporting the base 24, itself fixed to the frame-work of the station which supports the rail 12.

The upright 26 has secured to it, for example, by means of a clamping ring 32, a proximity detector 34 basically cylindrical in shape, whose front measuring face 36 is disposed facing the base 24 at a distance "d" on the opposite side from the sheave 20. The inductive type detector 34 comprises a coil (not shown) whose inductance varies with the distance "d".

It can easily be understood that a flexion of the base 24 due to the action of the bearing force of the sheave 20 makes the distance "d" decrease, the latter returning by elasticity to the initial position after the sheave 20 has passed over the section L.

The detector 34 emits a signal proportional to the distance "d" and therefore proportional to the clamping force of the grip and this signal is transmitted by cables 38 to an electronic processing unit.

The proximity detector 34 may be of a different type.

Tests have shown that the measurement accuracy is quite sufficient to monitor the grips, only a slight drift in the signal having to be taken into account.

Figure 4:
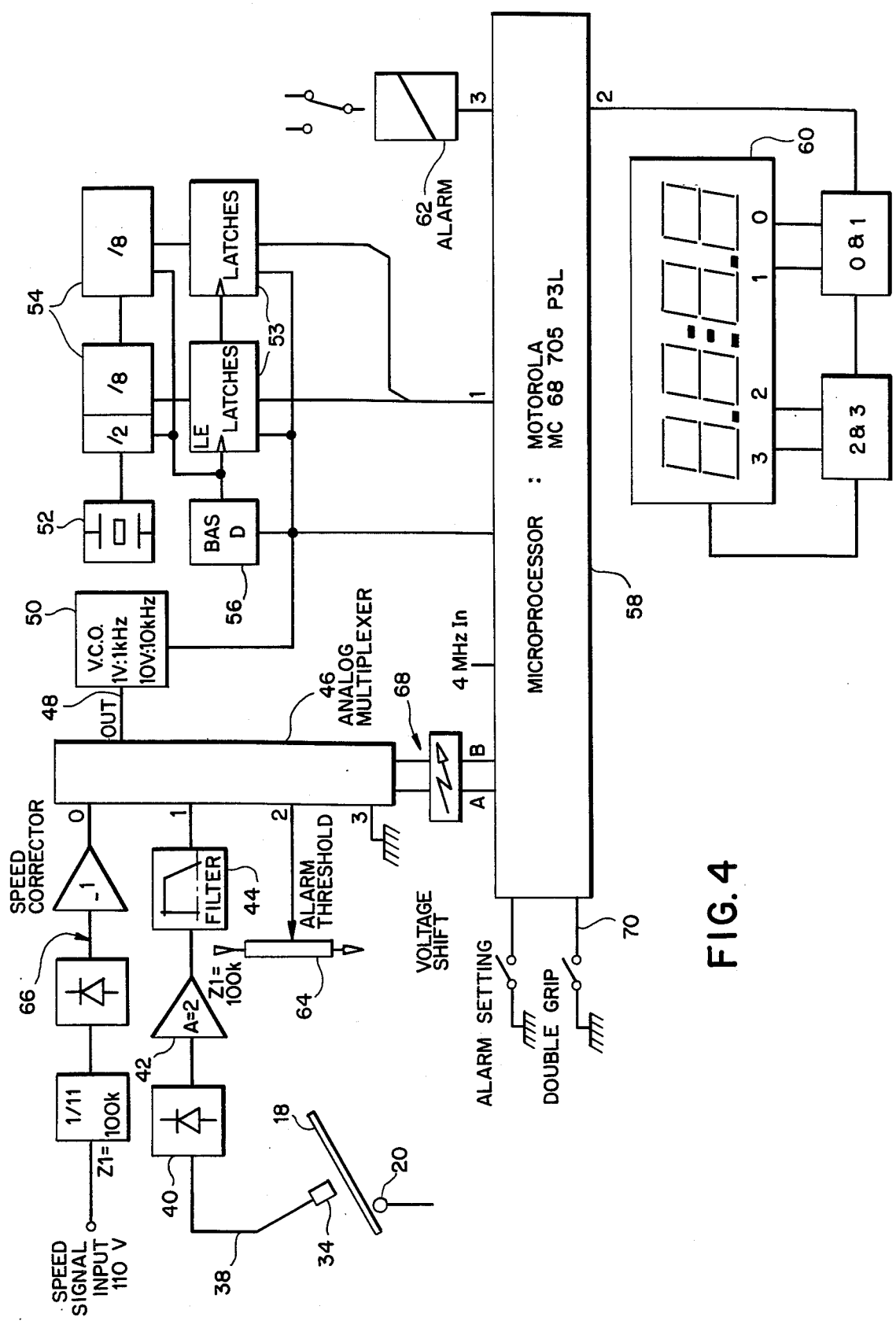
FIG. 4 is the mimic diagram of the electronic processing circuit.

FIG. 4 represents the mimic diagram of the processing unit of the signal emitted by the detector 34. The analog voltage signal is transmitted by the cables 38 to a protection unit 40 and after amplification and shaping in units 42, 44, is applied to an input 1 of an analog multiplexer 46 the output 48 of which is connected to a converter 50 which generates a signal of a frequency proportional to the voltage signal. The frequency signal is applied to a timer unit 54, via latching relays 53. The timers 54 are piloted by a clock 52 and fitted with a reset device 56.

Port 1 of a microprocessor 58, for example of the MC 68705 P3L type from the MOTOROLA Company, is connected to the timers 54 to request the latter cyclically for information. Output ports 2 and 3 of the microprocessor 58 are connected respectively to a display system 60 and to an alarm 62.

An alarm threshold display unit 64 is connected to input 2 of the multiplexer 46, which can receive on input 0 a correction signal (in speed, for example), which enables the influence of inertia when the grips pass at high speed to be taken into account. The speed correction signal is generated in a shaping circuit 66 receiving on input a signal representative of the speed of the grips.

The multiplexer 46 is connected to the microprocessor 58 by connections 68 transmitting threshold and speed information.

Figure 5:
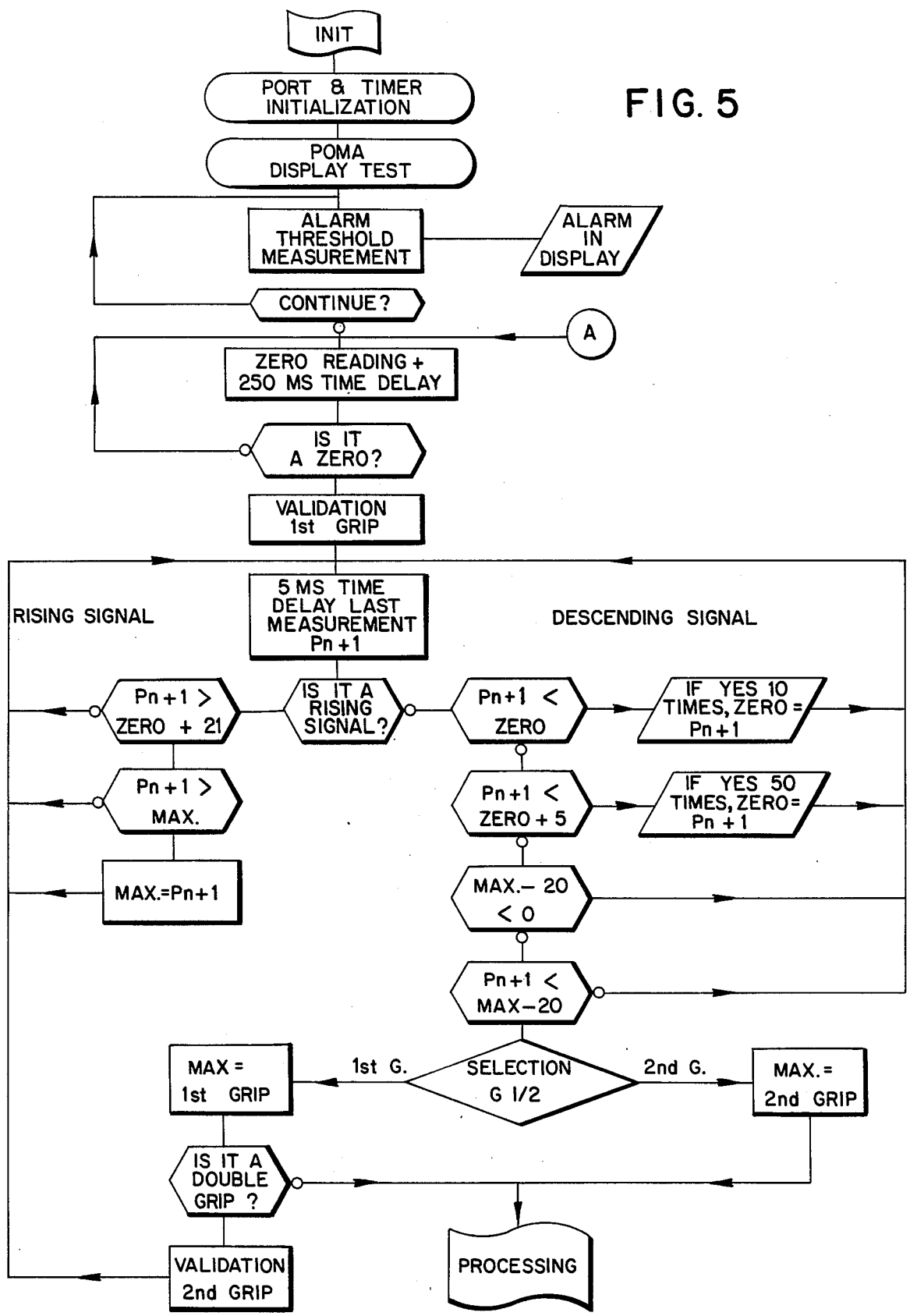
FIG. 5 is the flow chart.

FIG. 5 represents the flow chart which will only be briefly dealt with. The microprocessor has to be initialized and a test carried out. Then the alarm threshold is read and displayed, and if the alarm is correctly set, the program is continued. These preliminary operations are only carried out when the system is powered on. A first measurement is made, in this case a reading of the timers 54, to check that it corresponds to a zero, if not it is necessary to start again until a zero reading is displayed.

After the first grip has been validated, the analysis of the signal in comparison with the signal of the previous reading enables a rising signal to be differentiated from a descending signal. So long as the signal is rising, the left-hand waiting for maximum value loop (in FIG. 5) is followed, and as soon as the signal becomes a descending one the right-hand loop is followed, the signal corresponding to maximum amplitude being transmitted by the right-hand circuit, after checking, for comparison of the signal with the threshold value with display of the maximum value and triggering of an alarm if the threshold is not reached.

The left-hand rising signal loop makes a comparison of the signal with the previously recorded maximum value, storing the new maximum value if the signal exceeds the previous one.

The right-hand descending signal loop analyzes the signal to check whether the zero retained at the outset was really a zero, i.e. the minimum measurement value (checked 10 times before validation) or a slightly higher figure (checked 50 times before validation), so as to control any drift of this value.

The zero and therefore the maximum value are thus adjusted to compensate for any drift in time and the measurement is perfectly reliable and accurate.

In installations having vehicle coupling carriages with double grips, the latter pass over the measurement section 1 a slight distance apart, and the measurements must take this reciprocal influence into account by making an appropriate discrimination. To this end, a double-grip signal 70 can be transmitted to one of the ports of the microprocessor 58 to modify the program and distinguish between the first and second grip. These adaptations do not change the operating mode of the measuring device according to the invention.

What is claimed is:

1. An aerial ropeway transport installation, notably a detachable chair lift or gondola lift, having grips coupling the chairs or cars to a rope, each grip having a spring urging the grip into a closing position clamping on the rope and an operating lever acting against the force of the spring to open the grip detaching it from the rope in the stations in a detachment section and commanding closing of the grip in an attachment section, said installation comprising in one of said sections a grip clamping measurement device made of a ramp actuating said operating lever when the grip passes said section and a detector of the deformation of said ramp having a part with a certain flexibility, said detector being a proximity detector disposed facing said part to measure the amplitude of the deformation of said part when the grip passes due to the action of the force exerted by said operating lever on the ramp.

2. The installation according to claim 1, wherein said detector comprises a fixed coil disposed facing said flexible part made of a ferrous material, a deformation of the flexible part causing a variation in the distance and inductance of the coil.

3. The installation according to claim 1, wherein said ramp is T-shaped and comprises a base and an upright, an actuating force of the operating lever being exerted perpendicularly on the base a part of which is mounted flexibly on the upright of the ramp, said force being applied edgeways on the upright which constitutes a rigid support for fixing said detector.

4. The installation according to claim 3, wherein a notch is made in the junction area between the base and said upright over a section of the ramp to achieve said flexible part of the base, which can be deformed by flexion in relation to the upright when a grip passes, the fixed part of the detector being disposed facing the deformable base to determine a clearance of variable thickness when the base is deformed.

5. The installation according to claim 1, wherein said ramp is located in the area controlling closing of the grip.

6. The installation according to claim 1, wherein said detector comprises an electronic circuit generating a voltage signal proportional to the deformation of said flexible part of the ramp.

7. The installation according to claim 6, wherein the voltage signal is applied to an input of an analog multiplexer connected to a converter which transforms the voltage signal into a frequency signal transmitted to a timer piloted by a clock, said timer being periodically requested to send information to a microprocessor.

8. The installation according to claim 7, wherein a microprocessor is connected on the one hand to said timer and on the other hand to said multiplexer, the latter receiving a threshold value from an alarm threshold unit, said microprocessor requesting the timer and the multiplexer to send information cyclically to determine the maximum value of the signal and to compare this value with the threshold value to trigger an alarm if this threshold is not reached, or to validate the correct status of the grip if the threshold is reached.

9. The installation according to claim 8, wherein the microprocessor analyzes the signal supplied by the timer and compares it with the previous reading to differentiate between a rising signal and a descending signal and to determine the maximum value when a descending signal appears following a rising signal, without any additional external information.

* * * * *